United States Patent [19]

Lettington et al.

[11] 4,122,344
[45] Oct. 24, 1978

[54] THERMAL IMAGING SYSTEM

[75] Inventors: Alan Harold Lettington; James Anthony Savage, both of Malvern, England

[73] Assignee: The Secretary of State for Defence in Her Britannic Majesty's Government of the United Kingdom of Great Britain and Northern Ireland, London, England

[21] Appl. No.: 811,415

[22] Filed: Jun. 29, 1977

[30] Foreign Application Priority Data

Jul. 1, 1976 [GB] United Kingdom ............... 27358/76

[51] Int. Cl.² ............................................. H01J 31/49
[52] U.S. Cl. ................................................. 250/334
[58] Field of Search ................ 250/227, 334, 330, 332

[56] References Cited

U.S. PATENT DOCUMENTS

| 3,379,832 | 4/1968 | Judin | 250/227 X |
| 3,436,757 | 4/1969 | Schwab | 250/227 X |
| 3,942,008 | 3/1976 | Eve et al. | 250/334 X |

Primary Examiner—Davis L. Willis
Attorney, Agent, or Firm—Pollock, Vande Sande and Priddy

[57] ABSTRACT

An imaging system in which radiation from a scene is focussed onto a rotor to sweep the image across a detector whose output is used to drive a display such as a cathode ray tube; the rotor has one or more bundles of radiation transmitting fibres. The system may operate in the visible or infra red part of the electromagnetic spectrum.

8 Claims, 6 Drawing Figures

THERMAL IMAGING SYSTEM

This invention relates to imaging systems, particularly thermal imaging systems. Such systems are well known per se, e.g., see "Thermal Imaging Systems" by J. M. Lloyd, Plenum Press, 1975, and "Thermal Imaging With Real Time Picture Presentation" by Sven-Bertel Borg, Applied Optics, Vol. 7, No. 9, pp 1697-1703, September 1968 (and the bibliography therein), and "Wide-Angle Infrared Camera For Industry and Medicine" by E. Sundstrom, Applied Optics, Vol. 7, No. 9, pp 1763-1768, September 1968. These systems operate in the visible or infra red (I.R.) part of the electromagnetic spectrum by collecting radiation from a scene and focussing it onto a detector which gives an electrical output proportional to radiation received. The detector output is displayed on a cathode ray tube in a conventional manner. In some systems a single small detector is effectively swept over the scene in a raster manner i.e. in a manner similar to that used in a television picture. One way of raster scanning requires a rotor having reflecting surfaces to sweep the scene image line by line onto the detector, successive surfaces having a differing inclination so that each surface sweeps successive lines. A disadvantage with this is the high rotor speed necessary to obtain a good quality display. An alternative system uses a reflecting rotor to scan a line onto the detector and an oscillating mirror to direct successive lines onto the detector. Again rotor speeds can be very high; also synchronism between rotor and mirror causes unwanted problems.

According to this invention, in an imaging system in which visible or infra red radiation from a scene is focussed onto a rotor to sweep an image of the scene onto a detector for subsequent reproduction of the scene on a display, the rotor includes a plurality of visible or infra red radiation transmitting fibres arranged for transferring radiation between different parts of the rotor's surface.

The rotor may be of cylindrical shape with a single bundle of fibres arranged diagonally, or a plurality of bundles each having one end staggered along the length of the rotor's curved surface and the other end lying in a common plane on the rotor's curved surface.

A correction plate comprising a plurality of visible or infra red radiation transmitting fibres may be arranged adjacent the rotor for directing radiation into the fibres in the rotor; such a plate may have a flat or slightly curved front surface and a rear surface which is complementary to the curved surface of the rotor and spaced a short distance from it.

The fibres used to transmit infra red are similar in principle and construction to those used in visible fibre optics except that the material used in the fibres must be capable of transmitting infra red radiation.

One such material is a glass, described in a co-pending patent application by A. H. Lettington and J. A. Savage (U.S. Ser. No. 811,414 filed June 29, 1977, for Infra Red Transmitting Glasses), which has up to 30 atomic percent of telluride substituted for selenide in a glass having a composition within the following range germanium 10-35 atomic percent
arsenic 9-45 atomic percent
selenide 45-70 atomic percent Preferably the glass range is within the area defined and bounded by the lines joining the following compositions in the GeAsSe ternary diagram expressed in atomic percentages $Ge_{22}As_9Se_{69}$, $Ge_{35}As_9Se_{56}$, $Ge_{35}As_{20}Se_{45}$, $Ge_{15}As_{40}Se_{45}$.

Typical fibre diameters are $50\mu$ and the binding matrix an epoxy resin. The ends of the fibres on the rotor and correction plate are preferably coated with a single or multi-layer anti-reflection coating such as a single layer of cerium flouride.

Various detectors may be used and cooled in conventional manner e.g. by liquid nitrogen. For example the detector material may be Cadmium Mercury Telluride (C.M.T.) described in U.S. Pat. No. 2,953,690, or Lead Tin Telluride (L.T.T.).

The invention will now be described by way of example only, with reference to the accompanying drawings of which:

Figure 1:
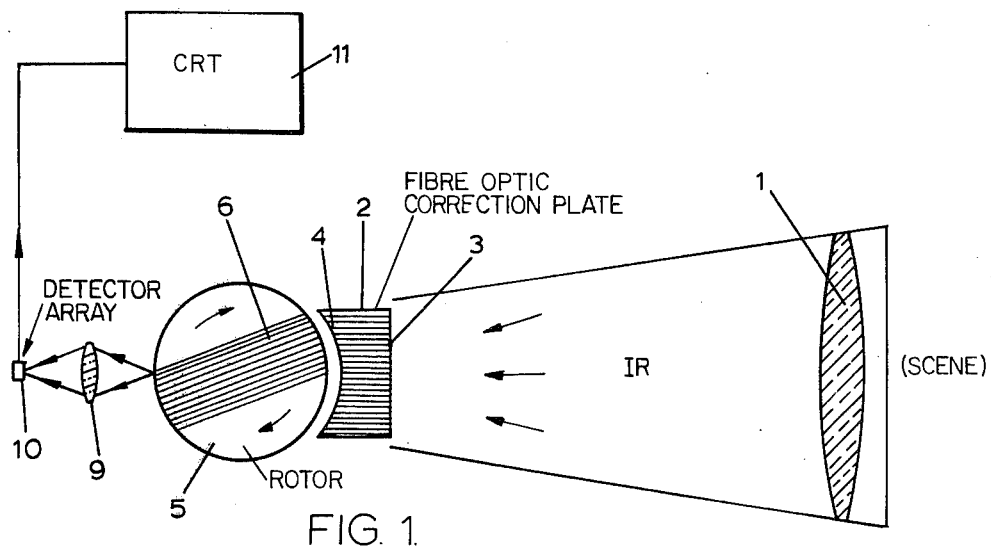
FIG. 1 is a schematic plan view of an infra red system constructed in accordance with the present invention.
Figure 2:
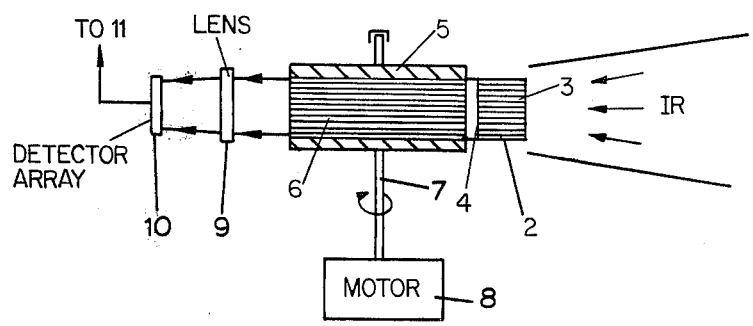
FIG. 2 is a sectional side view of part of the system shown in FIG. 1.

As shown in FIGS. 1 and 2 infra red radiation from a scene is collected and focussed by a lens 1 onto a fibre optic correction plate 2. This plate 2 comprises numerous fibres of infra red transmitting glass held parallel to one another in a glass binder with the fibres lengths perpendicular to the flat front face 3 of the plate. The rear face 4 of the plate 2 is of a cylindrical curvature. Behind the plate 2 is a cylindrically shaped rotor 5 comprising a bundle 6 of infra red transmitting fibre arranged parallel to one another in a binder. The remainder of the rotor 5 is of lightweight plastics material mounted on a rotor spindle 7 for rotation by an electric motor 8. The direction of rotation of rotor 2 is immaterial.

Behind the rotor 5 is a lens 9 which focusses images from the rotor 5 onto a linear detector array 10 whose output is used to form a display in a conventional manner e.g. on a cathode ray tube 11. The number of elements in the detector array 10 is equal to the number of lines in the scene, thus for a clear display as large a number as possible is used, typically 200 detector elements.

When the rotor 5 is rotated, the image on the correction plate 2 is swept across the detector array 10 twice per revolution. The rotor periphery is equispaced from the rear face 4 of the plate 2 resulting in good transmission of the image between the plate 2 and rotor 5 because the image leaves and enters the fibres normal to their end surfaces. The displayed scene may be interlaced by tilting the axis of the fibres 6 relative to the normal to the axis of the rotor 5.

As shown the rotor diameter is about $\sqrt{2}\ x$ width of the image on the correction plate 2, the width of the fibre bundle is about half the image width, and the height of the fibre bundle is the height of the image. Such a rotor has a dead time of about 75%. For a smaller drum, equal to the image width on the plate 2, the dead time is about 50% but a loss in definition can occur at the edge of the displayed image.

As an alternative to the system shown in FIGS. 1 and 2, a single detector element may be used and an additional vertical scanning mirror or rotor used to obtain a vertical sweeping the image. If a vertical scanning rotor is used, it is arranged orthogonal to the rotor of FIGS. 1, 2 and a double curved fibre optical correction plate is located between the two rotors.

One drawback of the rotor shown in FIGS. 1, 2 is the dead time i.e. the period during which no image is transmitted between the plate and detector array and the large number of detector elements needed for a good quality display.

Figure 5:
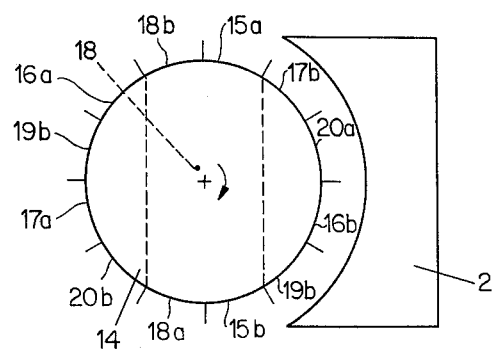
FIG. 5 is a plan view of the rotor of FIGS. 3 and 4.
Figure 3:
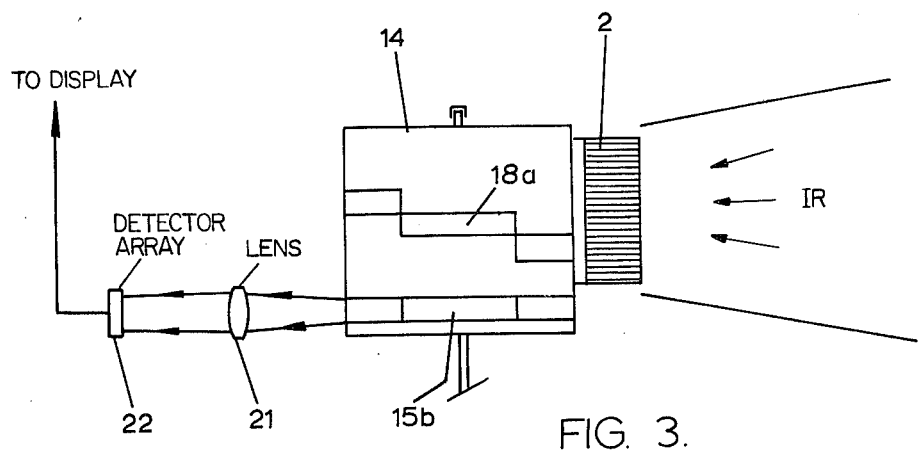
FIG. 3 is a view of an alternate construction of rotor which gives vertical and horizontal scanning of a scene.
Figure 4:
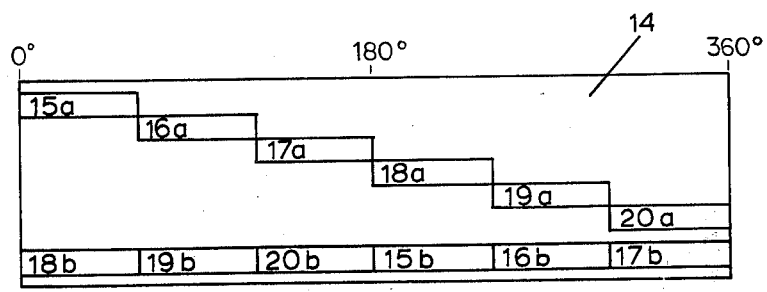
FIG. 4 is a developed view of the rotor of FIG. 3.

One rotor 14 which avoids this dead time and which produces a vertical scan, thereby reducing the number of detector elements, is shown in FIGS. 3, 4 and 5. For simplicity of illustration the image on the correction plate 2 is swept in six bands. Six bundles 15, 16, 17, 18, 19, 20 of parallel spaced fibres are arranged with one end 15a to 20a spaced around the curved surface of the rotor 14 equispaced in a vertical direction collectively covering the total height of the image formed on the correction plate 2. The other ends 15b to 20b of the bundles are arranged diametrically opposite to the ends 15a to 20a respectively but in a common plane on the rotor circumference. Each bundle 15 to 20 has a width equal to half the image (on the plate 2) width and a height equal to the band height, i.e., one-sixth of the correction plate image height. Output from the rotor is through a lens 21 to a detector array 22 which only requires a number of elements large enough to give a good quality display for one band height.

In operation with the rotor 14 rotating, the top sixth of the image is scanned by the fibre bundle 15 onto the detector array 22, followed by scanning of the next lower sixth of the image by the fibre bundle 16, and so on until the whole image is scanned. This process is repeated once for each revolution of the rotor 14.

As an example of a rotor 14 constructed according to FIGS. 3, 4 and 5, the number n of bands was 28, the width w of the image was 2cm, and the rotor diameter was therefore $nw/2\pi = 8.91$ cm.

The correction plate 2 may be replaced by a lens for some applications when losses associated with the infra red image not entering the rotor fibres normal to their ends may be accepted.

The lens 9, or 21 may be replaced by infra red transmitting fibres. This allows considerable freedom in placing the detector e.g. away from the rotor 5 and in a cooled chamber.

Figure 6:
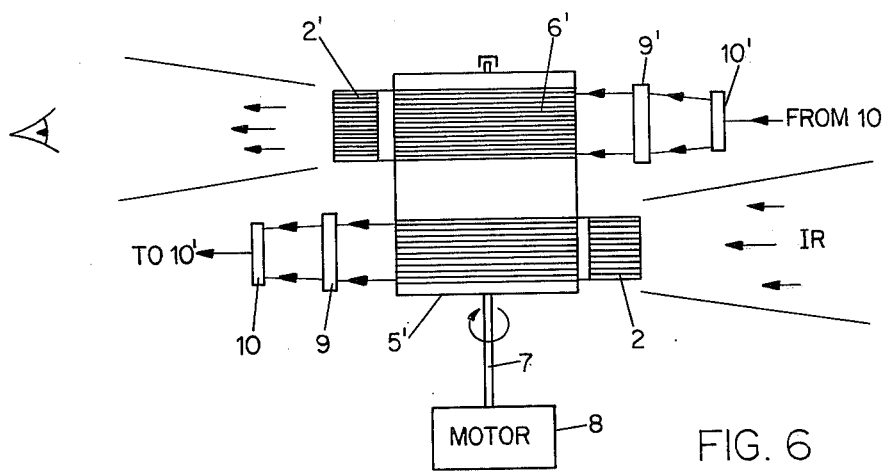
FIG. 6 illustrates a modification of the system shown in FIG. 2, for use as a picture generator.

Since the imaging system may also be operated using visible light it may be used as a picture generator i.e. the reverse of that described above with reference to FIGS. 1, 2. This is shown in FIG. 6 which duplicates the system of FIGS. 1, 2 but using some visible light components. Components common to FIGS. 1, 2 and 6 are given like reference numerals. The rotor 5' is extended along its axis and carries a second bundle 6' of visible light transmitting fibres arranged diametrically in the rotor 5'. A visible light modulated light source 10', e.g., one or more light emitting diodes (LED's), is modulated by the electrical signal from the detector 10. Light from the LED's 10' passes along the fibre bundle 6' and onto a visible fibre optic plate 2' where it may be observed as a visible image of the infra red scene.

We claim:

1. A thermal imaging system comprising means for focusing infra red radiation of a scene as a two dimensional image onto a rotor, said rotor being of circular cross section and having at least one bundle of infra red transmitting fibres arranged with the ends of the bundle at different parts of the curved surface of the rotor, a detector of infra red radiation disposed adjacent said rotor, said detector being capable of providing an electrical signal output representative of infra red energy incident thereon, means for rotating said rotor to sweep the image of said scene onto said detector, and means responsive to the electrical signal from said detector for displaying a two dimensional visible image representative of the scene.

2. The system according to claim 1 wherein the rotor is cylindrical and carries a single bundle of fibres arranged with their ends substantially diametricaly opposite one another.

3. The system according to claim 1 wherein the rotor is cylindrical and carries a plurality of bundles of fibres, each bundle having one end staggered along the length of the rotor curved surface and the other end lying along a common circumferential band on the curved surface of the rotor.

4. The system according to claim 1 wherein the means for focussing the scene includes a fibre optic plate comprising a plurality of infra red radiation transmitting fibres for transmitting the image onto the ends of the fibres in the rotor.

5. The system according to claim 4 wherein the surface of the fiber optic plate adjacent the rotor is curved to match the curved surface of the rotor with a gap between the two surfaces.

6. The system according to claim 5 wherein the ends of the fibres in the rotor and plate are coated with an anti-reflection coating.

7. A thermal imaging system according to claim 1 and further comprising a visible light source modulated by the output from said detector, a plurality of visible light transmitting fibres in said rotor, means for directing said light source onto said fibres in the rotor, and means for receiving light from the fibres in said rotor and for forming a visible image of the modulated light representing the infra red image of the scene.

8. An infra red imaging system comprising means for focusing infra red radiation of a scene as a two-dimensional infra red image on one surface of an infra red transmitting fibre plate, a cylindrically shaped rotor having arranged therein a plurality of infra red transmitting fibres arranged in at least one bundle to transmit the image from one part of the curved surface of the rotor to another, the adjacent surfaces of the rotor and fibre plate being spaced apart and of complementary curvature, means for focusing infra red radiation from the fibres in the rotor onto an infra red detector, means rotating the rotor to cause the image to be swept across the detector, and means for displaying the detector's output as a two dimensional visible image of the infra red image.

* * * * *